(12) United States Patent
He et al.

(10) Patent No.: US 8,740,080 B2
(45) Date of Patent: Jun. 3, 2014

(54) IMAGING READER FOR AND METHOD OF RECEIPT ACKNOWLEDGMENT AND SYMBOL CAPTURE

(75) Inventors: Duanfeng He, South Setauket, NY (US); Thomas Lackemann, Sayville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 515 days.

(21) Appl. No.: 12/321,954

(22) Filed: Jan. 26, 2009

(65) Prior Publication Data

US 2010/0187313 A1    Jul. 29, 2010

(51) Int. Cl.
*G06K 7/10* (2006.01)

(52) U.S. Cl.
USPC .................. 235/462.07; 235/456; 235/462.41

(58) Field of Classification Search
USPC ................................ 235/462.07, 462.41, 456
See application file for complete search history.

(56) References Cited

U.S. PATENT DOCUMENTS

| | | | |
|---|---|---|---|
| 4,613,895 A | | 9/1986 | Burkey et al. |
| 5,194,722 A | * | 3/1993 | Mergenthaler et al. .. 235/462.12 |
| 5,703,349 A | | 12/1997 | Meyerson et al. |
| 2004/0262392 A1 | | 12/2004 | Longacre, Jr. et al. |
| 2006/0071081 A1 | * | 4/2006 | Wang ........................ 235/462.45 |
| 2006/0091216 A1 | * | 5/2006 | Page ........................ 235/462.07 |

OTHER PUBLICATIONS

European Search Report dated Mar. 30, 2010 in related European case 10150732.5.

* cited by examiner

*Primary Examiner* — Michael G Lee
*Assistant Examiner* — Tabitha Chedekel
(74) *Attorney, Agent, or Firm* — Nong-Qiang Fan

(57) ABSTRACT

An imaging reader for, and a method of, imaging symbols of different symbologies and a receipt acknowledgment, include a solid-state imager having an array of image sensors for capturing return light from the symbols of different symbologies and the receipt acknowledgment over a field of view, and a controller operatively connected to the imager. The controller is automatically configured for detecting a symbol having a specific symbology, for decoding the symbol having the specific symbology, for processing the receipt acknowledgment only when the symbol having the specific symbology has been detected and decoded, and for decoding symbols having symbologies different from the specific symbology when the symbol having the specific symbology has not been detected.

15 Claims, 3 Drawing Sheets

IMAGING READER FOR AND METHOD OF RECEIPT ACKNOWLEDGMENT AND SYMBOL CAPTURE

DESCRIPTION OF THE RELATED ART

Solid-state imaging systems or imaging readers have been used, in both handheld and hands-free modes of operation, to capture images from diverse targets, such as bar code symbols to be electro-optically read and/or non-symbols to be processed for storage or display. Bar code symbols have different bar and space patterns that are used to represent different characters. Sets of these patterns are grouped together to form a symbology. There are many types of bar code symbologies, each having their own special characteristics and features. Most symbologies are designed to meet the needs of a specific application or industry. One omnipresent symbology is the Universal Product Code (UPC), which is comprised of a linear arrangement of bars and spaces (each termed as an element) of various widths that, when decoded, uniquely identify a product and its manufacturer. Other symbologies include, by way of non-limiting example, Code 128, Interleaved 2 of 5, Discrete 2 of 5, IATA 2 of 5 and MSI. Non-symbols can include any person, place or thing, especially a signature or seal that signifies receipt and acceptance of a transaction, such as a parcel delivery.

The imaging reader includes a solid-state imager having an array of photocells or light sensors, which correspond to image elements or pixels in a field of view of the imager, an illuminating light assembly for illuminating the field of view with illumination light from an illumination light source, e.g., a laser or one or more light emitting diodes (LEDs), and an imaging lens assembly for capturing return ambient and/or illumination light scattered and/or reflected from the target being imaged over a range of working distances. Such an imager may include a one- or two-dimensional charge coupled device (CCD) or a complementary metal oxide semiconductor (CMOS) device and associated circuits for producing electronic analog signals corresponding to a one- or two-dimensional array of pixel information over the field of view. The imager is analogous to the imagers used in cameras.

When the target is a symbol, signal processing circuitry including a digitizer is used for digitizing the analog signal, and a programmed microprocessor or controller is used for processing and decoding the digitized signal based upon a specific symbology used for the symbol. When the target is a non-symbol, the signal processing circuitry will typically de-skew the captured image, re-sample the captured image to be of a certain size, enhance the quality of the captured image, and compress the captured image prior to transmission to a memory or remote host.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

It is desirable in many applications for the imaging reader to read symbols of different symbologies. The controller in the reader is typically configured to read a specific symbology. If another symbology is to be read, then the controller has to be re-configured, typically by operator interaction. The operator has to manually configure the controller.

In other applications, especially in the parcel delivery field, the controller in the reader is typically configured not only to read a specific symbology, but also to capture an image of a recipient's signature or seal. If another symbology is to be read, or if signature/seal capture is not required or desired, then the controller has to be re-configured, again typically by manual action by the operator.

As advantageous as such known imaging readers have been in capturing images and/or decoding them into identifying data, manually configuring the controllers with symbology and/or signature/seal capture restrictions required extra effort and expertise, and not all readers could be so configured. It would be desirable to reduce the configuration burden imposed on the operators and the controllers of such imaging readers and to enhance the responsiveness and reading performance of such imaging readers.

SUMMARY OF THE INVENTION

One feature of the present invention resides, briefly stated, in an imaging reader for imaging targets, especially bar code symbols of different symbologies and a receipt acknowledgment, such as a signature or seal. The reader includes a solid-state imager having an array of image sensors for capturing return light from the symbols of different symbologies and the receipt acknowledgment over a field of view. Preferably, the imager is a CCD or a CMOS with a rolling or a global shutter. The array may be one-dimensional, i.e., linear arranged along a single row, or two-dimensional having mutually orthogonal multiple rows and columns. Preferably, each symbol has a plurality of elements of different light reflectivity, e.g., bars and spaces, spaced apart along a scan direction lengthwise of the symbol.

In accordance with this invention, a programmed microprocessor or controller is operatively connected to the imager, and is automatically configured for detecting a symbol having a specific symbology, for decoding the symbol having the specific symbology, for processing the receipt acknowledgment only when the symbol having the specific symbology has been detected and decoded, and for decoding symbols having symbologies different from the specific symbology when the symbol having the specific symbology has not been detected.

Advantageously, the controller is configured for decoding the symbol having the specific symbology and the processing of the receipt acknowledgment in one mode of operation, and for decoding the different symbologies in another mode of operation. The controller is configured for automatically switching in real time without operator interaction between the modes. Thus, an operator does not need to manually configure the controller with symbology parameters and/or signature/seal capture parameters in order to change operational modes.

In a preferred embodiment, the controller is configured for detecting whether the symbol has the specific symbology and whether the symbol has a predetermined number of data characters lying within a predetermined range of the data characters. Also, the controller is operative for processing the receipt acknowledgment in a receipt area of the field of view, by locating a symbol area in the field of view of the symbol having the specific symbology, and by locating the receipt area based on the located symbol area. Both the processed receipt acknowledgment and the decoded symbol having the specific symbology are transmitted away from the controller to, for example, a local memory or a remote host, only after both the symbol having the specific symbology has been detected and decoded, and only after the receipt acknowledgment has been processed.

Another feature of the present invention resides in a method of imaging symbols of different symbologies and a receipt acknowledgment. The method is performed by capturing return light from the symbols of different symbologies and the receipt acknowledgment over a field of view, detecting a symbol having a specific symbology, decoding the symbol having the specific symbology, processing the receipt acknowledgment only when the symbol having the specific symbology has been detected and decoded, and decoding symbols having symbologies different from the specific symbology when the symbol having the specific symbology has not been detected.

Advantageously, the decoding of the symbol having the specific symbology and the processing of the receipt acknowledgment are performed in one mode of operation, and the decoding of the different symbologies is performed in another mode of operation. Automatic switching between the modes in real time is performed without operator interaction, thereby relieving the operator of manual interaction in order to change operational modes.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
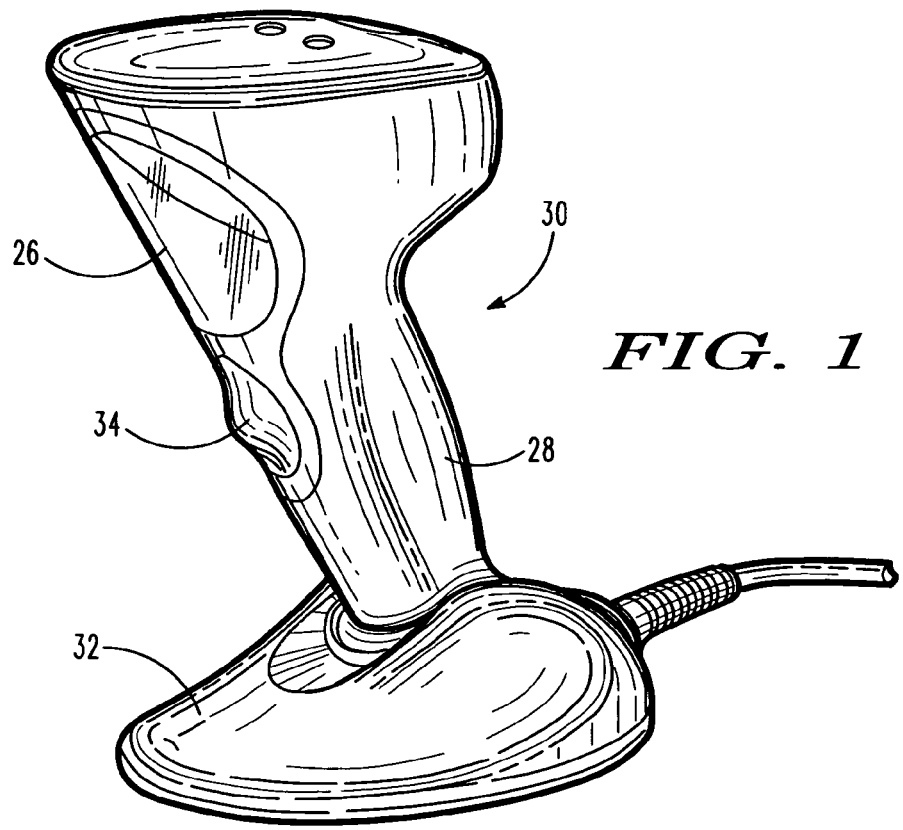
FIG. 1 is a perspective view of a portable imaging reader operative in either a handheld mode, or a hands-free mode, for capturing return light from targets.

Reference numeral 30 in FIG. 1 generally identifies an imaging reader having a generally upright window 26 and a gun-shaped housing 28 supported by a base 32 for supporting the imaging reader 30 on a countertop. The imaging reader 30 can thus be used in a hands-free mode as a stationary workstation in which targets are slid, swiped past, or presented to, the window 26, or can be picked up off the countertop and held in an operator's hand and used in a handheld mode in which the reader is moved, and a trigger 34 is manually depressed to initiate imaging of targets, especially symbols of different symbologies and a receipt acknowledgment, as described below and illustrated in FIG. 3, to be read at a distance from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
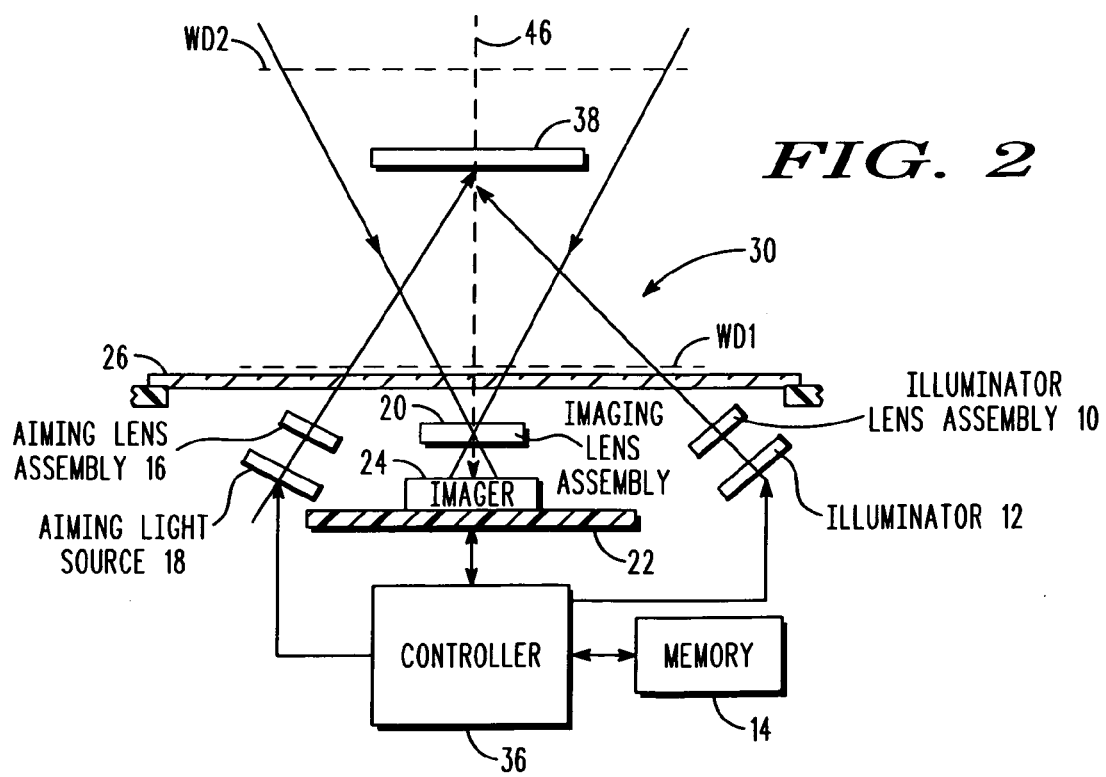
FIG. 2 is a schematic diagram of various components of the reader of FIG. 1.

As schematically shown in FIG. 2, an imager 24 is mounted on a printed circuit board 22 in the reader. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from a target 38 as pixel data over a two-dimensional field of view. The imaging lens assembly 20 is operative for adjustably focusing the return light onto the array of image sensors to enable the target 38 to be imaged. The target 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also mounted in the imaging reader and preferably includes an illuminator or illuminating light source 12, e.g., a light emitting diode (LED) or a laser, and an illuminating lens assembly 10 to uniformly illuminate the target 38 with an illuminating light having an intensity level over an illumination time period. The light source 12 is preferably pulsed.

An aiming assembly is also mounted in the imaging reader and preferably includes an aiming light source 18, e.g., an LED or a laser, and an aiming lens assembly 16 for generating a visible aiming light pattern on the target 38. The aiming pattern is useful to help the operator accurately aim the reader at the target 38.

As shown in FIG. 2, the imager 24, the illuminating light source 12 and the aiming light source 18 are operatively connected to a controller or programmed microprocessor 36 operative for controlling the operation of these components. Preferably, the microprocessor 36 is operative for processing the return light from the target 38, and for decoding the captured target image when the target is a bar code symbol. A memory 14 is accessible by the controller 36 for storing and retrieving data.

In operation, the controller 36 sends a command signal to energize the aiming light source 18 prior to reading, and also pulses the illuminating light source 12 for the illumination time period, say 500 microseconds or less, and energizes and exposes the imager 24 to collect light, e.g., illumination light and/or ambient light, from the target 38 during an exposure time period. A typical array needs about 16-33 milliseconds to acquire the entire target image and operates at a frame rate of about 30-60 frames per second.

Figure 3:
FIG. 3 is a view of a parcel delivery label depicting such targets as bar code symbols to be read, and a receipt acknowledgment area to be captured, by the reader of FIG. 1.

As shown in FIG. 3, a parcel delivery label 60 includes, among other things, an addressor area 62 in which the addressor of a parcel to be delivered is identified, an addressee area 64 in which the addressee of the parcel is identified, a symbol area 66 in which a symbol 68 having a specific symbology, e.g., Code 128, and indicative of a tracking number for the parcel, is located, another symbol area 70 in which a different symbol 72 having a different symbology is located, and a receipt acknowledgment area 74 in which a receipt acknowledgment 76, such as a handwritten signature or a stamp/seal, is entered upon delivery of the parcel. The target 38 may be the symbol 68 and the receipt acknowledgment 76 in one mode of operation, or may be a symbol, like the symbol 68 or 72 on another different label, in another mode of operation.

In accordance with this invention, the controller 36 is automatically configured, in the one mode of operation, for detecting and decoding a symbol, such as the Code 128 symbol 68 having a specific symbology, and for processing the receipt acknowledgment 76 only after the Code 128 symbol 68 has been detected and decoded. Both the processed receipt acknowledgment 76 and the decoded Code 128 symbol 68 are transmitted away from the controller 36 to, for example, the local memory 14 or a remote host, only after both the Code 128 symbol 68 has been detected and decoded, and only after the receipt acknowledgment 76 has been processed.

In the other mode of operation, the controller 36 is configured for decoding symbols, such as symbol 72 on another label, having symbologies different from the Code 128 symbology when the Code 128 symbol 68 has not been detected. The decoded different symbol is transmitted away from the controller 36 to, for example, the local memory 14 or a remote host.

The controller 36 is configured for automatically switching in real time without operator interaction between the modes. Thus, an operator does not need to manually configure the controller 36 with symbology parameters and/or signature/seal capture parameters in order to change operational modes.

In a preferred embodiment, the controller 36 is configured for detecting whether the symbol has a specific symbology and whether the symbol has a predetermined number of data characters lying within a predetermined range of the data characters. Also, the controller 36 is operative for processing the receipt acknowledgment 76 in the receipt area 74 of the field of view, by locating a symbol area 66 in the field of view of the symbol having the specific symbology, and by locating the receipt area 74 based on the located symbol area 66.

Figure 4:
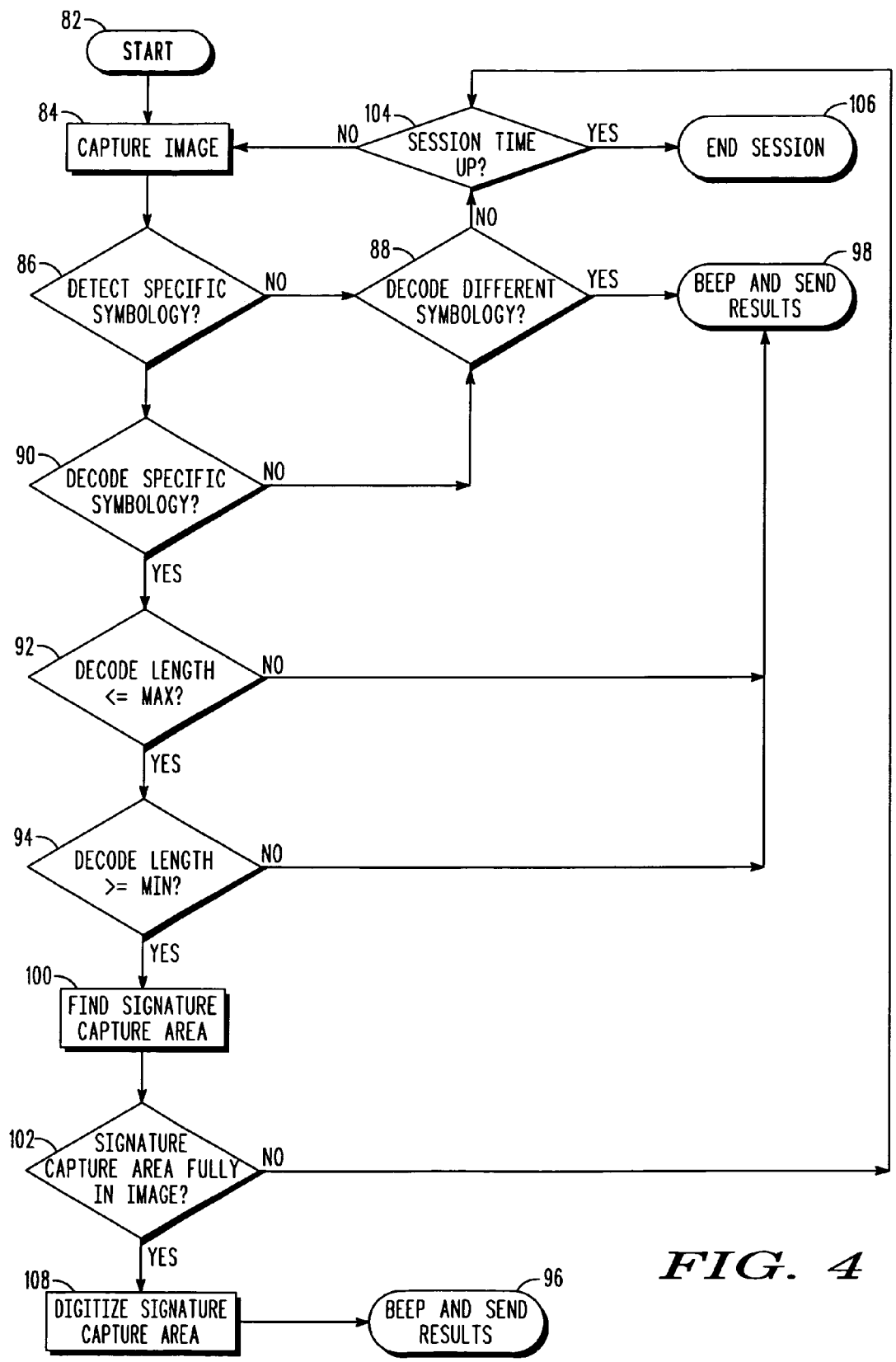
FIG. 4 is a flow chart explaining operation of the reader of FIG. 1 in accordance with this invention.

FIG. 4 is a flow chart depicting the method of this invention. Starting at start step 82, the controller 36 is operative at step 84 for capturing an image of the target 38. At step 86, the controller 36 is operative for detecting whether the target 38 is a specific symbology, e.g., Code 128. This can be performed by having the reader read a self-configuring, special configuration symbol, or by a command from a remote host, or manually. If so, then the controller 36 is operative for decoding the Code 128 symbol 68 at step 90. Once the Code 128 symbol 68 has been decoded, the controller 36 checks at step 92 whether the decoded Code 128 symbol 68 has less than a maximum number of data characters, and at step 94 whether the decoded Code 128 symbol 68 has more than a minimum number of data characters. If the decoded Code 128 symbol 68 has a number of data characters lying within the specified maximum and minimum numbers, then the controller 36 finds the receipt acknowledgment area 74 at step 100, checks whether the receipt acknowledgment area 74 is fully within the captured image at step 102, and digitizes the receipt acknowledgment area 74 at step 108. Once the receipt acknowledgment 76 has been captured at step 108, the controller 36 transmits both the receipt acknowledgment 76 and the decoded Code 128 symbol 68 away from the controller 36, and a beep or other indicator is generated at step 96.

If the controller 36 detects that the target 38 is not a Code 128 symbol at step 86, or if the controller 36 detects that a Code 128 symbol was not decoded at step 90, then the controller 36 is operative for decoding the different symbol at step 88. Once the different symbol has been decoded, the controller 36 transmits the decoded different symbol away from the controller 36, and a beep or other indicator is generated at step 98. If a different symbol has not been decoded at step 88, then the controller 36 checks at step 104 whether the image capture session time has elapsed. If not, then the controller 36 attempts to capture the image again at step 84. If so, then the controller 36 ends the image capture session at step 106. If the controller 36 determines that the receipt acknowledgment area 74 is not fully within the captured image at step 102, then the controller 36 checks at step 104 whether the image capture session time has elapsed.

It will be understood that each of the elements described above, or two or more together, also may find a useful application in other types of constructions differing from the types described above. For example, this invention is not to be limited solely to detecting Code 128 symbols as the above-described specific symbology. Also, this invention is not to be limited solely to imaging readers whose only function is to image bar code symbols and receipt acknowledgments, but could equally apply to mobile computers or terminals having an imager as one of its subsystems.

While the invention has been illustrated and described as an imaging reader for, and a method of, capturing a receipt acknowledgment and symbols of different symbologies, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An imaging reader for imaging symbols of different symbologies and a receipt acknowledgement, comprising: a solid-state imager having an array of image sensors for capturing return light from the symbols of different symbologies and the receipt acknowledgement over a field of view to form a captured image; a controller operatively connected to the imager, and automatically configured for detecting a symbol having a specific symbology for automatically switching in real time without operator interaction between at least two operation modes; and wherein the controller decodes said symbol having said specific symbology and processes the receipt acknowledgement captured in the image in a first mode of operation after the captured image is obtained only if said symbol in the captured image having said specific symbology has been detected and decoded, and wherein the controller further decodes symbols having symbologies different from said specific symbology and does not process the receipt acknowledgement captured in the image in a second mode of operation if said symbol having said specific symbology has not been detected.

2. The reader of claim 1, wherein the controller is configured for detecting whether said symbol has a predetermined number of data characters lying within a predetermined range of said data characters.

3. The reader of claim 1, wherein the controller is configured for processing the receipt acknowledgment in a receipt area of the field of view.

4. The reader of claim 1, wherein the controller is configured for locating a symbol area in the field of view of said symbol having said specific symbology, and for locating the receipt area based on the located symbol area.

5. The reader of claim 1, wherein the controller is configured for transmitting both the processed receipt acknowledgment and said decoded symbol having said specific symbology away from the controller, only after both said symbol having said specific symbology has been detected and decoded, and only after the receipt acknowledgment has been processed.

6. An imaging reader for imaging symbols of different symbologies and a receipt acknowledgment, comprising:
   means for capturing return light from the symbols of different symbologies and the receipt acknowledgment over a field of view to form a captured image;

control means for detecting a symbol in the captured image having a specific symbology, for decoding said symbol having said specific symbology, for processing the receipt acknowledgment in the captured image only when said symbol in the captured image having said specific symbology has been detected and decoded, and for decoding symbols having symbologies different from said specific symbology without processing the receipt acknowledgment in the captured image when said symbol having said specific symbology has not been detected.

7. The reader of claim 6, wherein the control means is configured for detecting whether said symbol has a predetermined number of data characters lying within a predetermined range of said data characters.

8. The reader of claim 6, wherein the control means is configured for processing the receipt acknowledgment in a receipt area of the field of view.

9. The reader of claim 8, wherein the control means is configured for locating a symbol area in the field of view of said symbol having said specific symbology, and for locating the receipt area based on the located symbol area.

10. The reader of claim 6, wherein the control means is configured for transmitting both the processed receipt acknowledgment and said decoded symbol having said specific symbology away from the controller, only after both said symbol having said specific symbology has been detected and decoded, and only after the receipt acknowledgment has been processed.

11. A method of imaging symbols of different symbologies and a receipt acknowledgment, comprising the steps of:
    capturing return light from the symbols of different symbologies and the receipt acknowledgment over a field of view to form a captured image;
    detecting a symbol in the captured image having a specific symbology;
    decoding said symbol having said specific symbology;
    processing the receipt acknowledgment in the captured image only when said symbol in the captured image having said specific symbology has been detected and decoded;
    decoding symbols having symbologies different from said specific symbology without processing the receipt acknowledgment in the captured image when said symbol having said specific symbology has not been detected; and
    wherein the step of decoding said symbol in the captured image having said specific symbology and the step of processing the receipt acknowledgment in the captured image are performed in a first mode of operation, and wherein the step of decoding said different symbologies is performed in a second mode of operation; and a step of automatically switching in real time without operator interaction between the modes.

12. The method of claim 11, and a step of detecting whether said symbol has a predetermined number of data characters lying within a predetermined range of said data characters.

13. The method of claim 11, wherein the step of processing the receipt acknowledgment is performed in a receipt area of the field of view.

14. The method of claim 13, and a step of locating a symbol area in the field of view of said symbol having said specific symbology, and a step of locating the receipt area based on the located symbol area.

15. The method of claim 11, a step of transmitting both the processed receipt acknowledgment and said decoded symbol having said specific symbology, only after both said symbol having said specific symbology has been detected and decoded, and only after the receipt acknowledgment has been processed.

* * * * *